United States Patent [19]

Hernandez et al.

[11] 4,088,027
[45] May 9, 1978

[54] FORCE BALANCE SERVO ACCELEROMETER

[76] Inventors: E. Norman Hernandez, 1615 Windmere Dr. E., Seattle, Wash. 98112; F. Daric Gichard, 1356 W. Armour, Seattle, Wash. 98119

[21] Appl. No.: 727,810

[22] Filed: Sep. 29, 1976

[51] Int. Cl.$^2$ ............................................. G01P 15/08
[52] U.S. Cl. ................................................. 73/517 B
[58] Field of Search .................. 73/516 R, 517 B, 514

[56] References Cited

U.S. PATENT DOCUMENTS

| | | | |
|---|---|---|---|
| 2,883,176 | 4/1959 | Bernstein | 73/516 R |
| 2,899,190 | 8/1959 | Driver | 73/517 B |
| 2,946,226 | 7/1960 | Wendt et al. | 73/517 B |
| 3,113,462 | 12/1963 | Wendt | 73/516 R X |
| 3,246,525 | 4/1966 | Clark | 73/517 B |
| 3,618,402 | 11/1971 | Kase | 73/517 B |
| 3,797,321 | 3/1974 | Morris | 73/517 B |

*Primary Examiner*—James J. Gill

[57] ABSTRACT

A force balance servo accelerometer including a D'Arsonval type mechanism for rebalancing, between a pair of sensing coils, a seismic mass moved by acceleration is disclosed. The D'Arsonval type mechanism comprises a pair of suspension beams mounted in parallel planes in a liquid filled cylindrical housing. A pair of axially aligned taut wires support a torque coil between the suspension beams. The coil surrounds a permanent magnet fixedly mounted in the housing. An arm extending outwardly from the coil, transverse to the axis of the taut wires, supports the seismic mass between the sensing coils, which are mounted in the housing. The sensing coils form two arms of a bridge circuit energized by an oscillator connected across one pair of opposing terminals of the bridge. The signal developed across the other pair of opposing terminals is applied to a differential amplifier. The resultant difference signal is sine wave multiplied with the output of the oscillator in a quadrature detector. The output of the quadrature detector, which is related to the acceleration of the seismic mass, is applied to the coil of the D'Arsonval mechanism to rebalance the seismic mass. A bellows mounted on one end of the housing allows the liquid in the housing to expand and contract as the temperature of the environment in which the D'Arsonval type mechanism is located changes.

41 Claims, 4 Drawing Figures

U.S.Patent May 9, 1978 Sheet 1 of 2 4,088,027
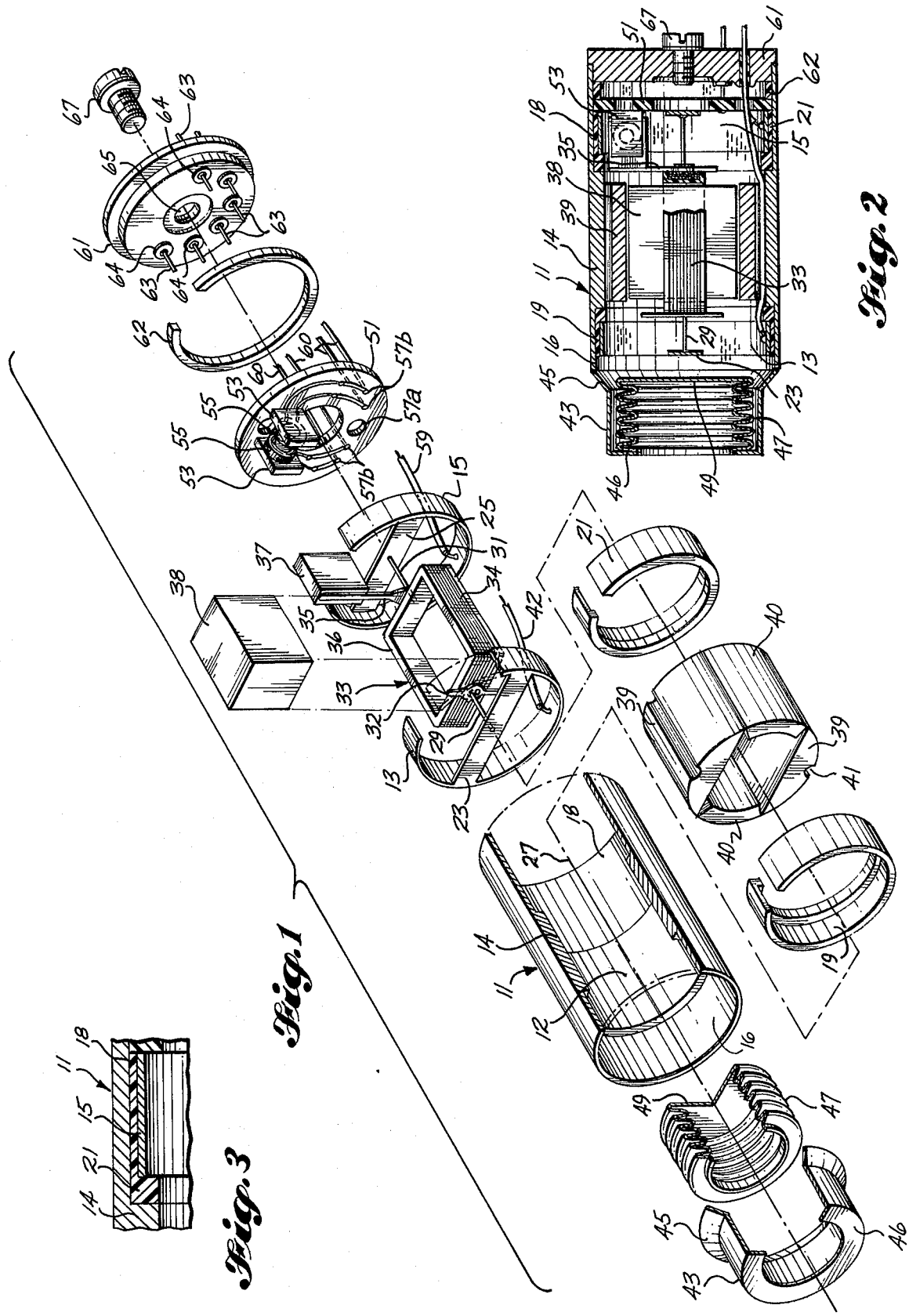

FORCE BALANCE SERVO ACCELEROMETER

BACKGROUND OF THE INVENTION

The invention is directed to accelerometers and, more particularly, to force balance servo accelerometers.

Accelerometers are used in a variety of scientific and industrial environments to measure various factors. For example, an accelerometer attached to a body measures the acceleration of the body along the sensing axis of the accelerometer. Integrating the output of such an accelerometer over a particular period of time provides a measurement of the velocity of movement of the object along the sensing axis of the accelerometer. Integrating the resultant velocity with respect to time results in a measurement of the distance of movement of the object, also along the sensing axis of the accelerometer. Accelerometers are also useful in other environments to provide other types of information. For example, they are useful in civil engineering and geophysical environments to measure forces, either forces applied to objects by some mechanical power source, or forces produced by nature.

Force balance servo accelerometers, are formed of two main subsystems. The first subsystem comprises a mechanical mechanism that includes a movable seismic mass. When the mass moves, due to the acceleration of the mechanical mechanism along a sensing axis, a mass position sensor modifies an electrical signal. The modified electrical signal is used to control a torquer adapted to rebalance the accelerometer seismic mass, i.e., return it to a neutral or null position. The magnitude of current necessary to rebalance the seismic mass is directly related to the acceleration of the mass. Thus, the output signal performs two functions—it provides an indication of the acceleration of the mass and it controls the rebalancing of the mass.

For a variety of reasons, prior art accelerometer mechanical mechanisms particularly those intended for use in civil engineering and geophysical environments, have not been as satisfactory as desired. One reason prior art accelerometer mechanical mechanisms have not been entirely satisfactory is a result of their delicate construction. Because of their delicate nature, prior art mechanisms have not been as useful as they could be in rugged environments where they are likely to be dropped on a hard surface or subjected to unduly harsh forces, because such forces may severely damage or in some cases destroy them. Further, prior art accelerometer mechanical mechanisms have often been more complicated and, therefore, expensive to construct, than desirable.

In addition to the foregoing disadvantages, many prior art accelerometer mechanical mechanisms have been noisy, i.e., they have been formed such that an excessive amount of noise (false information) is present in their output signals. As a result, relatively expensive electronic filtering circuits have been required to clarify the output signals prior to their use. Further, the hysteresis present in such mechanisms has been higher than desirable.

With respect to the electronic subsystems of prior art force balance servo accelerometers, they also have not been as satisfactory as desirable. Many such circuits have drifted excessively due to component aging and/or changes in the temperature of the environment in which the mechanical portion of the accelerometer is located, or the environment in which the electronic subsystem is located, or both environments. Also, circuit imbalances caused by the use of separate oscillators driving sensing coils have led to unsatisfactory results being obtained.

Therefore, it is an object of this invention to provide a new and improved accelerometer.

It is a further object of this invention to provide a new and improved force balance servo accelerometer.

It is another object of this invention to provide a new and improved mechanical mechanism for use in force balance servo accelerometers.

It is yet another object of this invention to provide a new and improved electronic subsystem suitable for use in force balance accelerometers.

It is a still further object of this invention to provide a low noise producing, low hysteresis, rugged mechanical mechanism useful in force balance servo accelerometers.

It is a still further object of this invention to provide a new and improved force balance servo accelerometer electronic subsystems that is essentially drift insensitive and independent of parameter variations occurring as a result of temperature fluctuations or component changes.

SUMMARY OF THE INVENTION

In accordance with this invention a new and improved force balance servo accelerometer is provided. In its preferred form the servo accelerometer includes a new and improved mechanical mechanism and a new and improved electronic subsystem. While the subsystems were developed for use with one another, those skilled in the art and others will recognize from the following description that each subsystem is also useful with other subsystems. That is, the mechanical mechanism of the invention is useful with other electronic subsystems and the electronic subsystem of the invention is useful with other mechanical mechanisms.

In its preferred form, the mechanical mechanism of the invention includes a new and improved D'Arsonval type mechanism for rebalancing, between a pair of sensing coils, a seismic mass moved by acceleration. The preferred form of the D'Arsonval type mechanism comprises a pair of suspension beams mounted in parallel planes in a liquid filled housing. A pair of axially aligned taut wires support a torque coil between the suspension beams. The coil surrounds a permanent magnet. An arm extending outwardly from the coil, transverse to the axis of the taut wires, supports the seismic mass between the pair of sensing coils, which are mounted in a fixed position in the housing. Movement of the seismic mass about the axis of the taut wires, due to acceleration, is toward one sensing coil and away from the other sensing coil. As a result, the phase of the impedance of one sensing coil changes with respect to the other. This variation in impedance via an electronic subsystem (the preferred form of which is hereinafter described) causes a current flow in a predetermined direction through the torque coil. The torque coil current creates a magnetic field that interacts with the field produced by the permanent magnet. The direction and magnitude of the resultant torque coil magnetic field is such that the seismic mass is returned to a null or center position between the sensing coils.

In the preferred form of the electronic subsystem, the sensing coils are connected to form two arms of a bridge circuit that is balanced when the seismic mass is at a null position. The bridge circuit is energized by an oscillator connected across one pair of opposing terminals of the bridge. The other pair of opposing terminals are connected to a differential amplifier. The output of the differential amplifier is combined with the output of the oscillator in a quadrature detector. The quadrature detector, in essence, sine wave multiplies its inputs and produces an output having a magnitude related to the magnitude of the acceleration applied to the seismic mass. It is this output that is applied to the torque coil of the D'Arsonval type mechanism to rebalance the seismic mass.

In addition, preferably, a phase shifter is connected between the output of the oscillator and its related input of the quadrature detector so that the input signals to the quadrature detector are maintained in phase. Further, preferably, a low band pass amplifier is connected to the output of the quadrature detector to eliminate signals developed at twice the frequency of oscillation and apply only essentially DC developed signals to the torque coil of the D'Arsonval type mechanism.

As will be appreciated by those skilled in the art and others, the invention overcomes the above noted disadvantages of many prior art accelerometers, particularly those of a force balance servo type. Specifically, the invention provides a force balance servo accelerometer having a rugged mechanical mechanism. Because the suspension beams are securely fastened on both ends, the dimensional location of the taut wires is both precise and stable. Further, the force balance servo accelerometer of the invention provides a mechanical mechanism that is acceleration sensitive substantially only about the axis of rotation of the seismic mass, i.e., it is relatively insensitive to accelerations in other directions. Since the mechanical mechanism provides a device wherein alignment of the axis of rotation is formed on, or very close to, the axis of the housing, axis alignment, a highly desirable characteristic in an instrumentation accelerometer, is achieved. With respect to the electronic subsystem, it is relatively insensitive to drift due to temperature and deterioration of components with time. In this regard, as a result of the same oscillator frequency being applied to the sensing coils and the quadrature detector, many output variations and fluctuations due to drift are automatically cancelled. Further, the circuit tends to be relatively independent of other parameters. Thus, performance is enhanced and manufacturing costs are greatly reduced.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is an exploded view, partially in section, of a preferred embodiment of an accelerometer mechanical mechanism formed in accordance with the invention;

FIG. 2 is a longitudinal cross-sectional view of the accelerometer mechanical mechanisms illustrated in FIG. 1;

FIG. 3 is an enlarged fragmentary view of a portion on FIG. 2; and,

DESCRIPTION OF THE PREFERRED EMBODIMENT

Figure 4:
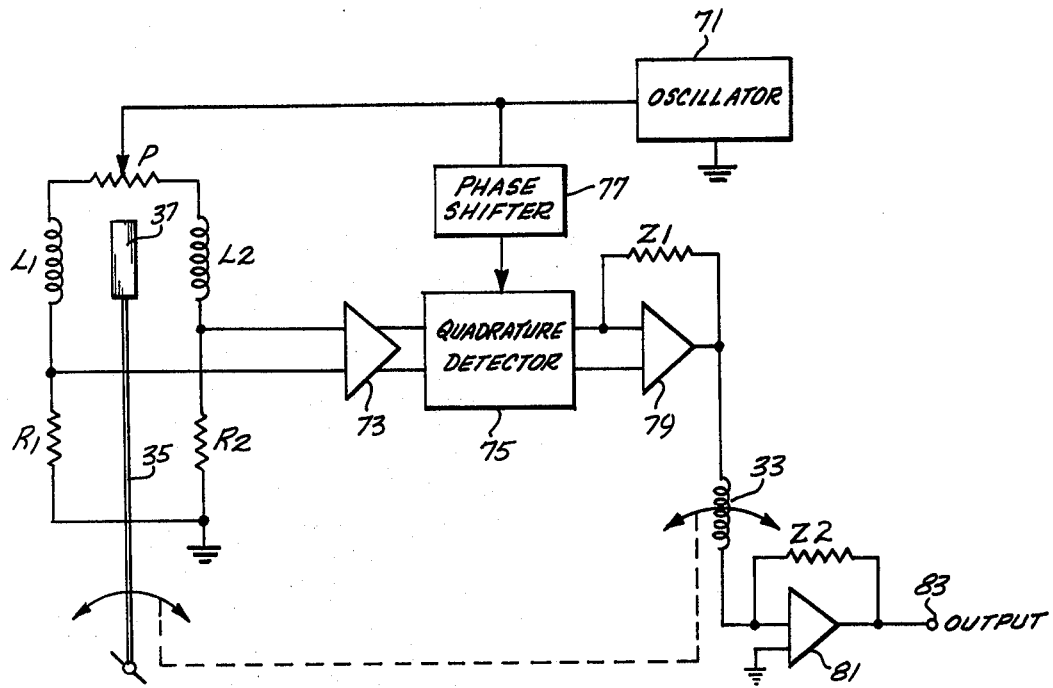
FIG. 4 is a partially schematic and partially block diagram of a preferred embodiment of an accelerometer electronic subsystem formed in accordance with the invention.

As will be readily recognized by those skilled in the accelerometer art, an overall accelerometer, particularly a force balance servo accelerometer, is essentially formed of two main subsystems—a mechanical mechanism and an electronic circuit. A preferred embodiment of a mechanical mechanism formed in accordance with the invention is illustrated in FIGS. 1, 2 and 3, and a preferred embodiment of an electronic circuit subsystem is illustrated in FIG. 4. While the mechanical mechanism and electronic subsystem were developed for use with one another, it will be recognized that they may be also used with other subsystems. Thus, the mechanical mechanism may be used with other electronic subsystems and the electronic subsystem may be used with other mechanical mechanisms.

The accelerometer mechanical mechanism illustrated in FIGS. 1 and 2 includes an elongate, cylindrical housing 11, formed of soft iron. The cavity 12 in said housing 11 includes a center region 14 slightly smaller in diameter than first and second end regions, 16 and 18. Mounted in the first end region of the housing is a first C-shaped beam support 13. Mounted in the second end 18 region of the housing is a second C-shaped beam support 15. The outer diameter of the C-shaped beam supports is slightly smaller than the diameter of the first and second regions of the cylindrical housing 11.

The C-shaped beam supports are formed of a good electrically conductive material, such as brass. Located between the first and second C-shaped beam supports 13 and 15 and the adjacent wall of their respective regions of the housing 11 are first and second electrical insulating rings 19 and 21, one associated with each beam support. The insulating rings 19 and 21 provide electrical insulation between the C-shaped beam supports 15 and 17 and the cylindrical housing wall in the first and second regions 16 and 18. In this regard, the inner edge of the rings, i.e., the edge nearest the center region 14 of the housing 11, is thicker. The thicker region prevents the C-shaped beam supports from longitudinally coming into electrical contact with the center region 14, as best illustrated in FIG. 3. The C-shaped beam supports 13 and 15 and the insulating layers are attached together and to the housing by a suitable adhesive, such as epoxy.

First and second suspension beams 23 and 25 are mounted across the outer peripheral surfaces of the C-shaped beam supports 13 and 15 so as to pass through, and lie orthogonal to, the longitudinal axis 27 of the cylindrical housing cavity 12. Thus, the suspension beams are supported at their ends by the outer peripheral edges of the C-shaped beam supports. As can be readily observed in the drawings, the suspension beams are flat and relatively thin. Preferably, the suspension beams are formed of a suitably rigid beryllium copper alloy, a well known spring material having high electrical conductivity, high strength and high hardness. First and second taut wires 29 and 31 project inwardly from the suspension beams 23 and 25, i.e., toward one another, along the longitudinal axis 27. Preferably the taut wires are formed of platinum.

Mounted between the taut wires 29 and 31 is a rectangular torque coil 33. The torque coil is formed by winding lightweight copper wire 34 around an apertured rectangular coil support 36, formed of aluminum, such that the axis of the coil lies along a line transverse to the longitudinal axis 27. The torque coil 33 is affixed to the inner ends of the taut wires 29 and 31 by a bracket 32 affixed to the coil winding by a suitable insulating adhesive such as epoxy. Electrical connection to the coil is made via the taut wires 29 and 31 to the suspension beams 23 and 25; and, the suspension beams form an electrical connection to the C-shaped beam supports 13 and 15. When the torque coil 33 is mounted between the suspension beams 23 and 25 in the cavity 12, the taut wires have no give or slack (i.e., they are taut). They are placed in a taut state by passing the wires through apertures in the suspension beams, stressing the wires and then soldering them to the suspension beams.

Affixed to and extending outwardly from one end of the torque coil 33, along an axis perpendicular to the plane defined by the support, is a mass suspension arm 35. The inner end of the mass suspension arm forms the taut wire attachment bracket on the related end of the coil Mounted on the outer end of the mass suspension arm 35 is a seismic mass 37 formed of a suitable eddy current loss material, i.e., a material whose presence or absence in the magnetic field produced by an electrically energized sensing coil will control the impedance of the coil, in accordance with the position of the mass with respect to the coil.

Mounted in the aperture in the torque coil 33 is a permanent magnet 38. The illustrated permanent magnet is a right rectangular parallelepiped in shape and, slightly smaller in length and width than the aperture in the torque coil 33. Thus, the coil is free to oscillate a slight amount about the permanent magnet without impinging on it.

Mounted on either end of the permanent magnet 38 are a pair of magnet supports 39. The magnet supports 39 have cylindrically curved outer surfaces, with the radius of curvature being equal to the radius of curvature of the center region 14 of the cylindrical housing 11. The sides of the magnet supports opposed to their cylindrically curved outersurfaces are flat. The thickness of the permanent magnet 37 is such that when the magnet supports are diametrically mounted in center region 14 of the cylindrical housing, the permanent magnet just fits between the supports. The regions outside of the torque coil between the magnet supports 39 are filled by a pair of curved pole pieces 40 formed of soft iron. A suitable adhesive maintains the supports, curved filler plates and magnet in the described positions when the mechanism is assembled.

At least one of the magnet supports 39 includes a semicylindrical outer aperture 41 lying parallel to the longitudinal axis 27 of the cylindrical housing 11. This aperture allows a wire 42 to pass through the housing 11, adjacent its wall, and be attached to the C-shaped beam support 13 located in the first end region 16 of the housing 11.

The outer end of the first end region 16 is herein referred to for convenience as the bellows end of the housing. A cylindrical cap 43 is attached to the bellows end of the housing. The cylindrical cap is smaller in diameter than the housing and includes a cone-shaped end 45 formed of soft iron. The cone-shaped end is attached by any suitable means such as soldering, brazing or welding, for examples, to the bellows end of the cylindrical housing 11. Alternatively it may be formed in a unitary manner with the housing. The outer end of the cap 43 includes an inwardly projecting washer shaped flange 46. Affixed to the flange 46 is the open end of an inwardly projecting cylindrical bellows 47.

The closed end 49 of the inwardly projecting cylindrical bellows 47 lies inside of the cylindrical cap, generally coplanar with the cone-shaped end 45. The longitudinal axes of the cylindrical cap and the cylindrical bellows are coaxially aligned with the longitudinal axis 27 of the cylindrical housing 11.

Located in the second end region of the cylindrical housing is a sensing coil support plate 51. The sensing coil support plate is washer-shaped, i.e., it is generally flat and includes a central aperture. The center of the central aperture, when the sensing coil support plate 51 is mounted in the second end region 18 of the cylindrical housing 11, lies on the longitudinal axis 27 and the plane of the support plate lies orthogonal thereto.

Projecting orthogonally inwardly from the sensing coil support plate 51 are a pair of flanges 53. The flanges 53 are spaced from one another and lie in parallel planes which if extended would lie on opposite sides of the longitudinal axis 27. Mounted on the facing surfaces of the flanges 53 are a pair of sensing coils 55, one for each flange. The flanges 53 are spaced such that the seismic mass 37 will fit between the coils when the overall structure is assembled in the manner illustrated in FIG. 2. The spacing is such that the seismic mass is movable through a small arc about its axis of rotation (the axis of the taut wires) when the housing is accelerated in a direction perpendicular to the plane defined by the longitudinal axis 27 and the arm 55. This direction is the acceleration sensing direction of the mechanical mechanism and is generally about the longitudinal axis 27.

Five apertures 57a-b (four small and one large) pass through the sensing coil support plate 51, along axes lying parallel to the longitudinal axis 27 of the cylindrical housing 11. Two wires pass through the large aperture 57a. One of these wires 42 is connected to the first C-shaped beam support 13, as discussed above. The other wire 59 is connected to the second C-shaped beam support 15. Four other wires 60 pass through the four smaller apertures 57b and are connected to four ends of the pair of sensing coils 55.

Located on the side of the sensing coil support plate 51 remote from the seismic mass 37 is a flat, cylindrical end closure plate 61 formed of soft iron. A C-shaped insulation 62 ring lies between the coil support plate 51 and the end closure plate 61. A suitable adhesive is used to affix the C-shaped insulation ring to the coil support plate 51 and affix both elements to the housing 11.

The end closure plate 61 supports six rigid, orthogonally arrayed wires 63 mounted in insulating rings 64. The inner ends of the wires 63 are connected to the other ends of the wires 60 connected to the sensing coils 55 and to the wires 42 and 59 connected to the first and second C-shaped beam supports 13 and 15, on a one-to-one basis. In addition, the end plate 61 includes a central aperture 65. The central aperture is provided to allow a suitable liquid, such as silicone oil, to be inserted into the housing after the foregoing elements are assembled in the manner previously described and best illustrated in FIG. 2. After the liquid is inserted, the aperture 65 in the end plate 61 is closed by suitable screw plug 67.

It will be appreciated from the foregoing description that the accelerometer mechanical mechanism illustrated in FIGS. 1, 2 and 3 is a D'Arsonval type mechanism. A D'Arsonval type mechanism, as will be readily understood by those skilled in the electronics art, is a mechanism having an arm whose position is controlled by the interaction of a magnetic field produced by a current flow through a coil with a permanent magnet.

This interaction causes movement of the arm 35, which, in the present mechanism, causes movement of the seismic mass 37.

It will be appeciated from the foregoing description and from viewing FIGS. 1, 2 and 3 that a relatively rugged accelerometer mechanical mechanism is provided by the invention. Preferably the taut wires 29 and 31 are soldered to the suspension beams 23 and 25 and, the suspension beams are soldered to the C-shaped beam supports. Because the suspension beams are securely fastened on both ends, the dimensional location of the taut wires is both precise and stable. Such precise and stable dimensional location means that the alignment of the axis of rotation of the rotational (seismic) mass is very close to the axis of the cylindrical housing, if not exactly coaxial. As will be appreciated by those skilled in the art and others, this characteristic, termed axis alignment, is a highly desirable characteristic in an instrumentation accelerometer. Further, the invention is suitable for use in environments where temperature variations cover a wide range, because the bellows allows the liquid within which the movable mechanism is mounted to expand and contract in accordance with temperature variations without such variations having a detrimental effect on the operation of the mechanism.

Turning now to the electronic subsystem illustrated in FIG. 4, the sensing coils 55 (denoted as inductors L1 and L2 in FIG. 4) are connected in a bridge circuit. The bridge circuit, in addition to L1 and L2 includes a pair of matched resistors designated R1 and R2. The bridge is formed by connecting one end of R1 to one end of L1 and one end of R2 to one end of L2. The other ends of R1 and R2 are connected together and to ground. The other ends of L1 and L2 are connected together via the resistive element of a balancing potentiometer P. The sliding element of P is connected to the output of an oxcillator 71. The junction between L1 and R1 is connected to one input of a differential amplifier 73. The junction between L2 and R2 is connected to the other input of the differential amplifier 73. The outputs of the differential amplifier 73 are connected to one input of a quadrature detector 75. The output of the oscillator 71 is connected through an adjustable phase shifter 77 to the second input of the quadrature detector 75. The output of the quadrature detector 75 is connected to the input of a low pass operational amplifier 79. A feedback element, designated Z1, connects the output of the low pass operational amplifier to its inverting input so as to control the pass band thereof in a conventional manner. The output of the low pass operational amplifier is connected to one end of the torque coil 33. The other side of the torque coil 33 is connected through a further low pass operational amplifier 81 to an output terminal 83. A feedback impedance designated Z2 is connected between the output of the second low pass operational amplifier 83 and its inverting input to control its pass band and scale factor. The non-inverting input is connected to ground.

In operation, when the bridge is balanced the inputs applied to the differential amplifier are the same, whereby the signal across the output of the differential amplifier is zero. This situation exists (assuming L1 = L2 and R1 = R2) when the seismic mass is at its null position between L1 and L2. When the seismic mass moves toward one of L1 and L2 and away from the other, the phase of the impedance of one of the inductive legs of the bridge increases with respect to the other, as a result of eddy current loss effects; and, the bridge becomes detuned or unbalanced. As a result a phase difference exists between the inputs of the differential amplifier. The differential amplifier now outputs both the difference [A-B, where A represents one differential amplifier input and B represents the other input] and minus the difference [−(A-B)] between these signals on the inputs connected to the quadrature detector. These signals form a combined signal 2(A-B), based on [A-B] [−(A-B)]. It should be noted that this difference signal is at the frequency of oscillation of the oscillator 71, i.e., A and B include sine/cosine components.

The quadrature detector, which is sometimes referred to as a balanced demodulator, sine wave multiplies the output of the differential amplifier with the output of the phase shifter 77. The phase shifter 77 is provided to adjust the phase of the oscillator related input of the quadrature detector so the output of the differential amplifier (if any existed) and the output of the oscillator are in phase when the seismic mass 37 is positioned exactly between the sensing coils L1 and L2.

The movement of the seismic mass toward one and away from the other sensing coil creates a differential amplifier output that includes the phase shift information applied to its inputs, discussed above. The output of the quadrature detector comprises sum and difference frequencies, both of which include the phase shift information describing the motion of the seismic mass toward one sensing coil and away from the other sensing coil. That is, the same phase shift information is centered about both twice the frequency of the oscillator and zero frequency. The low pass operational amplifier 79 rejects information at twice the frequency of oscillation and passes the information centered around zero. The zero or DC information is applied to the torque coil 33 which, as illustrated by the dashed line, causes the seismic mass (due to the interaction between the torque coil's magnetic field and the magnetic field produced by the permanent magnet 37) to move the seismic mass toward its null or center position between the sensing coils L1 and L2. In addition, the signal flowing through the torque coil 33 forms an output whose magnitude is related to the magnitude of the current necessary to move the seismic mass back to its center position, which magnitude is related to the acceleration applied to the seismic mass about its axis of rotation. That is, the current driven through the torque coil is proportional to the phase shift between the first and second sensor coil signals, as detected by the differential amplifier. As this phase shift is proportional to the acceleration of the seismic mass, the counteracting torque current, which acts to continuously maintain the seismic mass centered between the sensing coils, is proportional to acceleration. It is this current value that is amplified by the low pass operational amplifier 81 to form a related output voltage at the output terminal 83.

As will be readily appreciated by those skilled in the art and others, the accelerometer electronic subsystem illustrated in FIG. 4 has a variety of advantages over prior art systems. For example, the dual inductive sensing arrangement provides an accurate electrical null position sensor for the seismic mass. More specifically, since the electrical center is defined as the geometric point between the sensing coils, when the seismic mass is located at that point, the complex impedance of each sensing coil and resistor combination (L1/R1 and L2/R2) are equal. Since the materials and geometries in each inductive leg are chosen and formed so as to be identical, thermal effects are balanced and, hence, cancelled. Further, common noise (noise being defined as all electrical signals other than signals containing the desired information), are cancelled, i.e., common mode rejection is high.

In addition, the use of a quadrature detector allows most of the gain in the system to be realized at the oscillator frequency. This result is achieved if the differential amplifier 73 is chosen to have a narrow pass band centered at the oscillator frequency. If the differential amplifier is so chosen virtually all noise pickup that is not associated with the oscillator is rejected and, hence, does not cause the output to contain erroneous information. Moreover, if a suitable quadrature detector (such as an LM 1496) is chosen, high common mode rejection by the quadrature detector itself is also provided. (The LM 1496 has an 85db common mode rejection.) Thus, signals not due to seismic mass motion are rejected. In addition, as will be further appreciated by those skilled in the art variations in the oscillator frequency (which preferably is in the low megahertz range, e.g., 3 MHz), do not result in a change in the null position. Thus, null stability is largely independent of oscillator frequency.

While a preferred embodiment of the invention has been illustrated and described, it will be appreciated by those skilled in the art and others that various changes can be made therein without departing from the spirit and scope of the invention. For example, balance demodulators other than quadrature detectors can be utilized, if desired. Further, other electronic and mechanical changes falling within the scope of the invention, as denoted in the appended claims, can be made if desired. Hence, the invention can be practiced otherwise than as specifically described herein.

The embodiments of the invention in which an exclusive property or privilege is claimed are defined as follows:

1. A force balance servo accelerometer comprising:
   (A) a D'Arsonval type mechanism comprising:
   (1) a housing having an elongate cavity formed therein, said cavity having a central longitudinal axis:
   (2) a pair of spaced suspension beams mounted in said cavity so as to pass orthogonally through said central longitudinal axis;
   (3) a pair of taut wires, one end of each of said taut wires being attached to one of said pair of spaced suspension beams, said taut wires projecting toward one another;
   (4) a torque coil affixed to the adjacent ends of said taut wires;
   (5) a permanent magnet mounted in said cavity in a position such that the magnetic field produced by said permanent magnet interacts with the magnetic field produced by said torque coil when a current flows through said torque coil;
   (6) an arm affixed to said torque coil so as to project in a direction transverse to said central longitudinal axis;
   (7) a seismic mass mounted on the outer end of said arm; and,
   (8) sensing means mounted in said housing so as to sense the position of said seismic mass, said sensing means including a pair of coils; and,
   (B) an electronic subsystem comprising:
   (1) circuit means, connected to said pair of said sensing coils, for forming, in combination with said pair of sensing coils, a bridge circuit that is balanced when said seismic mass is in a predetermined null position;
   (2) an oscillator connected across one pair of opposing terminals of said bridge circuit;
   (3) difference means connected across the other pair of opposing terminals of said bridge circuit for producing an output containing information related to the difference in phase between the signals occurring at said other pair of opposing terminals;
   (4) multiplying means connected to the output of said difference means and to said oscillator for multiplying the output of said difference means by the output of said oscillator; and
   (5) connecting means for connecting the output of said multiplying means to said torque coil of said D'Arsonval type mechanism.

2. A force balance servo accelerometer as claimed in claim 1 wherein said D'Arsonval type mechanism includes a pair of C-shaped suspension beam supports mounted in spaced relationship in said cavity in said housing, one of said pair of spaced suspension beams being affixed to each of said C-shaped suspension beam supports.

3. A force balance servo accelerometer as claimed in claim 2 wherein said cavity is filled with a liquid and including a bellows in communication with said cavity such that any expansion and contraction of said liquid is absorbed by said bellows.

4. A force balance servo accelerometer as claimed in claim 3 wherein said torque coil includes an apertured, generally rectangular coil form and a coil of electrically conductive wire wound about said coil form, the ends of said wire being connected each to one of said taut wires; and, wherein said suspension beam and said C-shaped suspension beam supports are formed of electrically conductive materials.

5. A force balance servo accelerometer as claimed in claim 4 wherein said permanent magnet is a rectangular parallelepiped in shaped and is mounted so as to lie within the aperture defined by said rectangular torque coil form.

6. A force balance servo accelerometer as claimed in claim 5 wherein said pair of sensing coils are mounted on opposing sides of said seismic mass.

7. A force balance servo accelerometer as claimed in claim 1 wherein said cavity is filled with a liquid and including a bellows in communication with said cavity such that any expansion and contraction of said liquid is absorbed by said bellows.

8. A force balance servo accelerometer as claimed in claim 1 wherein said torque coil includes an apertured, generally rectangular coil form and a coil of electrically conductive wire wound about said coil form, the ends of said wire being connected each to one of said taut wires; and, wherein said suspension beam and said C-shaped suspension beam supports are formed of electrically conductive materials.

9. A force balance servo accelerometer as claimed in claim 8 wherein said permanent magnet is a rectangular parallelepiped in shaped and is mounted so as to lie within the aperture defined by said rectangular torque coil form.

10. A force balance servo accelerometer as claimed in claim 1 wherein said pair of sensing coils are mounted on opposing sides of said seismic mass.

11. A force balance servo accelerometer as claimed in claim 1 wherein said connecting means is a low pass filtering means.

12. A force balance servo accelerometer as claimed in claim 11 wherein said circuit means comprises first and second resistors connected in series with said first and second sensing coils, respectively, the other ends of said resistors connected together and to signal ground; and including a potentiometer connected across the other ends of said sensing coils, the sliding element of said potentiometer connected to the signal output of said oscillator.

13. A force balance servo accelerometer as claimed in claim 12 wherein said difference means is a differential amplifier.

14. A force balance servo accelerometer as claimed in claim 13 wherein said multiplying means is a quadrature detector and including a phase shifter connected between the output of said oscillator and its related input of said quadrature detector.

15. A force balance servo accelerometer as claimed in claim 14 wherein said low pass filtering means comprises a low-pass operational amplifier.

16. A force balance servo accelerometer as claimed in claim 1 wherein said circuit means comprises first and second resistors connected in series with said first and second sensing coils, respectively, the other ends of said resistors connected together and to signal ground; and including a potentiometer connected across the other ends of said sensing coils, the sliding element of said potentiometer connected to the signal output of said oscillator.

17. A force balance servo accelerometer as claimed in claim 1 wherein said difference means is a differential amplifier.

18. A force balance servo accelerometer as claimed in claim 1 wherein said multiplying means is a quadrature detector and including a phase shifter connected between the output of said oscillator and its related input of said quadrature detector.

19. A D'Arsonval type mechanism for a force balance servo accelerometer comprising:
(A) a housing having an elongate cavity formed therein, said cavity having a central longitudinal axis;
(B) a pair of spaced suspension beams formed of a thin spring material mounted in said cavity so as to pass orthogonally through said central longitudinal axis, said suspension beams being supported entirely at their ends;
(C) a pair of taut wires, one end of each of said taut wires being attached to one of said pair of spaced suspension beams intermediate the ends thereof, said taut wires being longitudinally stressed and projecting toward one another;
(D) a torque coil affixed to the adjacent ends of said taut wires;
(E) a permanent magnet mounted in said cavity in a position such that the magnetic field produced by said permanent magnet interacts with the magnetic field produced by said torque coil when a current flows through said torque coil;
(F) an arm affixed to said torque coil as to project in a direction transverse to said central longitudinal axis;
(G) a seismic mass mounted on the outer end of said arm; and,
(H) sensing means mounted in said housing so as to sense the position of said seismic mass.

20. A D'Arsonval type mechanism as claimed in claim 19 wherein said sensing means comprises a pair of sensing coils mounted on opposite sides of said seismic mass.

21. A D'Arsonval type mechanism as claimed in claim 20 including a pair of cross-sectionally thin C-shaped suspension beam supports mounted in spaced relationship in said cavity in said housing, one of said pair of spaced suspension beams being affixed to an edge of each of said C-shaped suspension beam supports so as to span said C-shaped suspension beam supports.

22. A D'Arsonval type mechanism as claimed in claim 21 wherein said cavity is filled with a liquid and including a bellows in communication with said cavity such that any expansion and contraction of said liquid is absorbed by said bellows.

23. A D'Arsonval type mechanism as claimed in claim 22 wherein said torque coil includes an apertured, generally rectangular coil form and a coil of electrically conductive wire wound about said coil form, the ends of said wire being connected each to one of said taut wires; and, wherein said suspension beam and said C-shaped suspension beam supports are formed of electrically conductive materials.

24. A D'Arsonval type mechanism as claimed in claim 23 wherein said permanent magnet is a rectangular parallelepiped in shape and is mounted so as to lie within the aperture defined by said rectangular torque coil form.

25. A D'Arsonval type mechanism as claimed in claim 19 wherein said cavity is filled with a liquid and including a bellows in communication with said cavity such that any expansion and contraction of said liquid is absorbed by said bellows.

26. A D'Arsonval type mechanism as claimed in claim 19 wherein said torque coil includes an apertured, generally rectangular coil form and a coil of electrically conductive wire wound about said coil form, the ends of said wires being connected each to one of said taut wires; and, wherein said suspension beams are formed of electrically conductive materials.

27. A D'Arsonval type mechanism as claimed in claim 26 wherein said permanent magnet is a rectangular parallelepiped in shape and is mounted so as to lie within the aperture defined by said rectangular torque coil form.

28. In a mechanical machanism for use in a force balance servo accelerometer wherein a current through a torque coil creates a magnetic field that interacts with the magnetic field produced by a permanent magnet so as to move a seismic mass whose position is sensed by a sensing means, the improvement comprising:
a pair of suspension beams formed of a thin spring material and supported entirely at their ends mounted on opposite sides of said torque coil; and,
a pair of taut wires, each of said taut wires being longitudinally stressed and affixed at one end to one of said suspension beams intermediate the ends thereof and at the other end to said torque coil.

29. The improvement claimed in claim 28 wherein said suspension beams are formed of beryllium copper.

30. The improvement claimed in claim 29 wherein said taut wires are formed of platinum.

31. The improvement claimed in claim 28 wherein said taut wires are formed of platinum.

32. The improvement claimed in claim 28 wherein said torque coil, permanent magnet, seismic mass, suspension beams and taut wires are all mounted in a liquid filled cavity and including the further improvement comprising a bellows in communication with said cavity such that the expansion and contraction of said liquid is absorbed by said bellows.

33. An electronic subsystem for a force balance accelerometer including a seismic mass whose position is controlled by the application of current to a torque coil and whose position is sensed by a pair of sensing coils, said electronic subsystem comprising:
  (A) circuit means, including said pair of sensing coils for forming, in combination with said pair of sensing coils, a bridge circuit that is balanced when said seismic mass is in a predetermined null position;
  (B) an oscillator connected across one pair of opposing terminals of said bridge circuit;
  (C) difference means connected across the other pair of opposing terminals of said bridge circuit for producing an output related to the difference in phase between the signals occurring at said other pair of opposing terminals;
  (D) multiplying means connected to the output of said difference means and to said oscillator for multiplying the output of said difference means by the output of said oscillator; and
  (E) connecting means for connecting the output of said multiplying means to said torque coil.

34. An electronic subsystem as claimed in claim 33 wherein said connecting means is a low pass filtering means.

35. An electronic subsystem as claimed in claim 34 wherein said circuit means comprises first and second resistors connected in series with said first and second sensing coils, respectively, the other ends of said resistors connected together and to signal ground; and including a potentiometer connected across the other ends of said sensing coils, the sliding element of said potentiometer connected to the signal output of said oscillator.

36. An electronic subsystem as claimed in claim 35 wherein said difference means is a differential amplifier.

37. An electronic subsystem as claimed in claim 36 wherein said multiplying means is a quadrature detector and including a phase shifter connected between the output of said oscillator and its related input of said quadrature detector.

38. An electronic subsystem as claimed in claim 37 wherein said low pass filtering means comprises a low-pass operational amplifier.

39. An electronic subsystem as claimed in claim 33 wherein said circuit means comprises first and second resistors connected in series with said first and second sensing coils, respectively, the other ends of said resistors connected together and to signal ground; and including a potentiometer connected across the other ends of said sensing coils, the sliding element of said potentiometer connected to the signal output of said oscillator.

40. An electronic subsystem as claimed in claim 33 wherein said difference means is a differential amplifier.

41. An electronic subsystem as claimed in claim 33 wherein said multiplying means is a quadrature detector and including a phase shifter connected between the output of said oscillator and its related input of said quadrature detector.

* * * * *